US010271279B2

(12) United States Patent
Raghavan et al.

(10) Patent No.: US 10,271,279 B2
(45) Date of Patent: Apr. 23, 2019

(54) BATTERY EFFICIENCY FOR TRACKING SHIPMENT ITEMS

(71) Applicant: INTERNATIONAL BUSINESS MACHINES CORPORATION, Armonk, NY (US)

(72) Inventors: Venkat Raghavan, New Castle, NY (US); Dinesh C. Verma, New Castle, NY (US)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 104 days.

(21) Appl. No.: 15/151,674

(22) Filed: May 11, 2016

(65) Prior Publication Data

US 2017/0332326 A1 Nov. 16, 2017

(51) Int. Cl.
*H04W 52/02* (2009.01)
*H04W 4/08* (2009.01)
*H04W 48/16* (2009.01)
*H04W 4/80* (2018.01)

(52) U.S. Cl.
CPC ......... *H04W 52/0229* (2013.01); *H04W 4/08* (2013.01); *H04W 4/80* (2018.02); *Y02D 70/10* (2018.01); *Y02D 70/1224* (2018.01); *Y02D 70/1262* (2018.01); *Y02D 70/142* (2018.01); *Y02D 70/144* (2018.01); *Y02D 70/146* (2018.01); *Y02D 70/162* (2018.01); *Y02D 70/164* (2018.01); *Y02D 70/166* (2018.01)

(58) Field of Classification Search
None
See application file for complete search history.

(56) References Cited

U.S. PATENT DOCUMENTS

| 7,623,029 | B2 | 11/2009 | Meyers | |
|---|---|---|---|---|
| 2008/0143516 | A1* | 6/2008 | Mock | G01S 5/0294 340/539.14 |
| 2010/0039284 | A1* | 2/2010 | Hall | G06Q 10/06 340/8.1 |
| 2011/0074587 | A1* | 3/2011 | Hamm | G06Q 10/08 340/584 |
| 2011/0116416 | A1 | 5/2011 | Dobson et al. | |
| 2012/0202428 | A1* | 8/2012 | Mirbaha | H04L 12/185 455/41.2 |
| 2013/0070636 | A1* | 3/2013 | Farley | H04W 4/008 370/254 |
| 2013/0238276 | A1 | 9/2013 | Vock et al. | |

(Continued)

FOREIGN PATENT DOCUMENTS

WO 2014104474 A1 7/2014

*Primary Examiner* — Duc T Duong
(74) *Attorney, Agent, or Firm* — Cantor Colburn LLP; Rahan Uddin

(57) ABSTRACT

Technical solutions are described for conserving battery consumption in tracking devices when tracking a plurality of shipment items. An example method includes receiving, by a first tracking device that is associated with a first shipment item, a tracking information of a second shipment item, the tracking information being transmitted by a second tracking device. The method also includes transmitting, by the first tracking device, a tracking message that includes the tracking information of the second shipment item and a tracking information of the first shipment item.

19 Claims, 6 Drawing Sheets

(56) References Cited

U.S. PATENT DOCUMENTS

| | | | |
|---|---|---|---|
| 2013/0316726 A1* | 11/2013 | Laws | H04W 4/029 |
| | | | 709/224 |
| 2015/0241566 A1 | 8/2015 | Chakraborty et al. | |
| 2015/0382085 A1 | 12/2015 | Lawrie-Fussey et al. | |
| 2016/0048800 A1* | 2/2016 | Whitten | G06Q 10/0833 |
| | | | 705/333 |
| 2017/0085291 A1* | 3/2017 | Linkesch | G06K 19/07722 |
| 2017/0228566 A1* | 8/2017 | Sengstaken, Jr. | G06K 7/10009 |
| 2017/0310485 A1* | 10/2017 | Robbins | H04L 9/3263 |
| 2017/0353943 A1* | 12/2017 | Skaaksrud | H04W 4/02 |
| 2018/0124549 A1* | 5/2018 | Samuelsson | H04W 4/023 |

* cited by examiner

BATTERY EFFICIENCY FOR TRACKING SHIPMENT ITEMS

BACKGROUND

The present application relates to improving battery efficiency when tracking shipment items, and more specifically, to reducing the electrical power being used for transmitting shipment item tracking status messages.

A shipment item, such as a package, a container carrying packages, or any other item being shipped may be tracked throughout the transport of the shipment item from a source to a destination. For example, an entity handling the various stages of shipping the shipment item may use an active tracking device (e.g., an active radio frequency identification device (RFID)) to track a location/status of the shipment item. RFID systems are typically either passive or active. Passive RFID systems use devices or tags with no internal power source. Passive RFID devices are powered by the electromagnetic energy transmitted from an RFID reader. Active RFID systems use battery-powered RFID devices or tags that continuously broadcast their own signal. Active RFID devices are commonly used as "beacons" to accurately track the real-time location of higher value assets for which the additional expense of active RFID devices is justified. Thus, the above-described active device may be implemented as a powered system that can track its own location and communicate that location periodically to a remotely located computing device, such as a server, using cellular or satellite communication network. However, battery life is a concern in such active tracking devices.

SUMMARY

According to one or more embodiments, a method for conserving battery consumption in tracking devices when tracking a plurality of shipment items includes receiving, by a first tracking device that is associated with a first shipment item, a tracking information of a second shipment item, the tracking information being transmitted by a second tracking device. The method also includes transmitting, by the first tracking device, a tracking message that includes the tracking information of the second shipment item and a tracking information of the first shipment item.

According to one or more embodiments, a tracking device is described that is configured to conserve battery consumption when tracking a plurality of shipment items, the tracking device being a first tracking device associated with a first shipment item. The tracking device includes a memory, a network interface, and a processor in communication with the memory and the network interface. The processor receives a tracking information of a second shipment item, the tracking information being transmitted by a second tracking device. The processor also transmits a tracking message that includes the tracking information of the second shipment item and a tracking information of the first shipment item.

According to one or more embodiments, a computer program product for conserving battery consumption in tracking devices when tracking a plurality of shipment items includes a non-transitory computer readable storage medium, the computer readable storage medium including computer executable instructions. The computer readable storage medium includes instructions to broadcast, by a first tracking device that is associated with a first shipment item, a request for a tracking information of a second shipment item that is associated with a second tracking device, where the request is broadcast using a first protocol. The readable storage medium also includes instructions to receive the tracking information of the second shipment item, the tracking information being transmitted by the second tracking device. The readable storage medium also includes instructions to transmit a tracking message that includes the tracking information of the second shipment item and a tracking information of the first shipment item, where the tracking message is transmitted using a second protocol.

BRIEF DESCRIPTION OF THE DRAWINGS

The examples described throughout the present document may be better understood with reference to the following drawings and description. The components in the figures are not necessarily to scale. Moreover, in the figures, like-referenced numerals designate corresponding parts throughout the different views.

DETAILED DESCRIPTION

Figure 1:
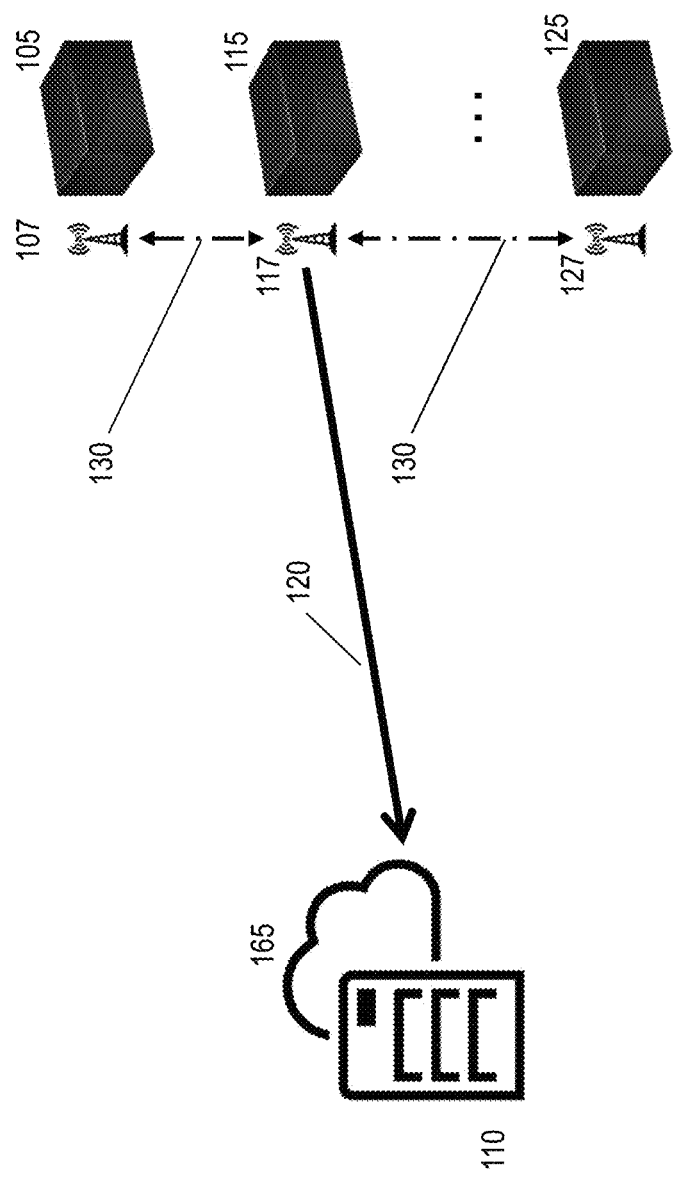
FIG. 1 illustrates an example system for tracking multiple shipment items in accordance with one or more embodiments.

A common approach to improving the battery efficiency of tracking devices includes activating the tracking device on demand by, for example, having the tracking device stay in a listen only mode instead of transmitting the location. However, such an approach does not give continuous real-time updates of the location of the tracking device, and thus the corresponding shipment item. Further, such an approach only provides tracking for the shipment item that is explicitly being sought. Thus, real-time detection of anomalous or misplaced shipment items is not possible using such an approach.

Another common approach for improving the battery efficiency includes duty cycling, in which the tracking device sleeps for some time and then wakes up. However, duty cycling alone, without proper coordination among different tracking devices, cannot enable proper tracking of different containers. Without proper coordination, some tracking information can be lost because a device was sleeping when the tracking information needed to be sent. With duty cycling, proper coordination mechanism needs to be established, which is provided by the technical solutions described herein.

Disclosed here are technical solutions for improving the battery life and/or the efficiency of the battery system of a tracking device while also providing continuous real-time updates of the location of the tracking device without requiring humans to define manual grouping of tracking devices. The technical solutions described herein facilitate improving the battery efficiency and/or the battery consumption by a tracking device by coordinating the location identification messages transmitted by a group of tracking devices. For example, the technical solutions facilitate tracking devices associated with shipment items that are being transported together to dynamically group together. The shipment items may be transported using transportation methods such as via a ship, a train, a truck, a car, or any other mode of transportation. Upon configuring the dynamic group of tracking devices that are being transported together, only one tracking device from the group communicates the location, or status, of the entire group of tracking devices. Further, the responsibility to transmit the location of the group rotates among different tracking devices in the group. By having a tracking device determine if it is part of the group, and communicating the status of the entire group of tracking devices, each tracking device reduces battery consumption by sharing the burden of tracking the entire group. For example, consider that a group of tracking devices includes N tracking devices corresponding to N shipment items. One of the tracking devices can send the tracking information on behalf of the entire group. Such communication may be N times slower, while maintaining the same granularity for sharing, for example if the communicating tracking device transmits the status of each tracking device sequentially. Battery power consumption depends on the distance the information has to be transmitted and on the number of messages that has to be sent. For example, the amount of power consumption is in order of square of distance of communication, and is linear in terms of how often a communication message is transmitted, the tracking devices can consume less power if the tracking device is transmitting short distance messages more frequently, and transmitting long distance at more infrequent intervals.

FIG. 1 illustrates an example system for tracking multiple shipment items. The system illustrates one shipment item 105, another shipment item 115 and another shipment item 125. Although only 3 shipment items are depicted, in practice any number of shipment items may be provided. The shipment items may be a package, a container, or any other type of item that is being shipped from a source to a destination. The shipment items may or may not be of the same type. Each of the shipment items 105, 115, and 125 is associated with a respective tracking device. For example, a tracking device may be a tracking device that transmits a tracking status message 120 of the corresponding shipment item. For example, the shipment item 105 is associated with a tracking device 107, the shipment item 115 is associated with a tracking device 117, and the shipment item 125 is associated with the tracking device 127. The tracking devices 107, 117, and 127 may or may not be of the same type.

Figure 2:
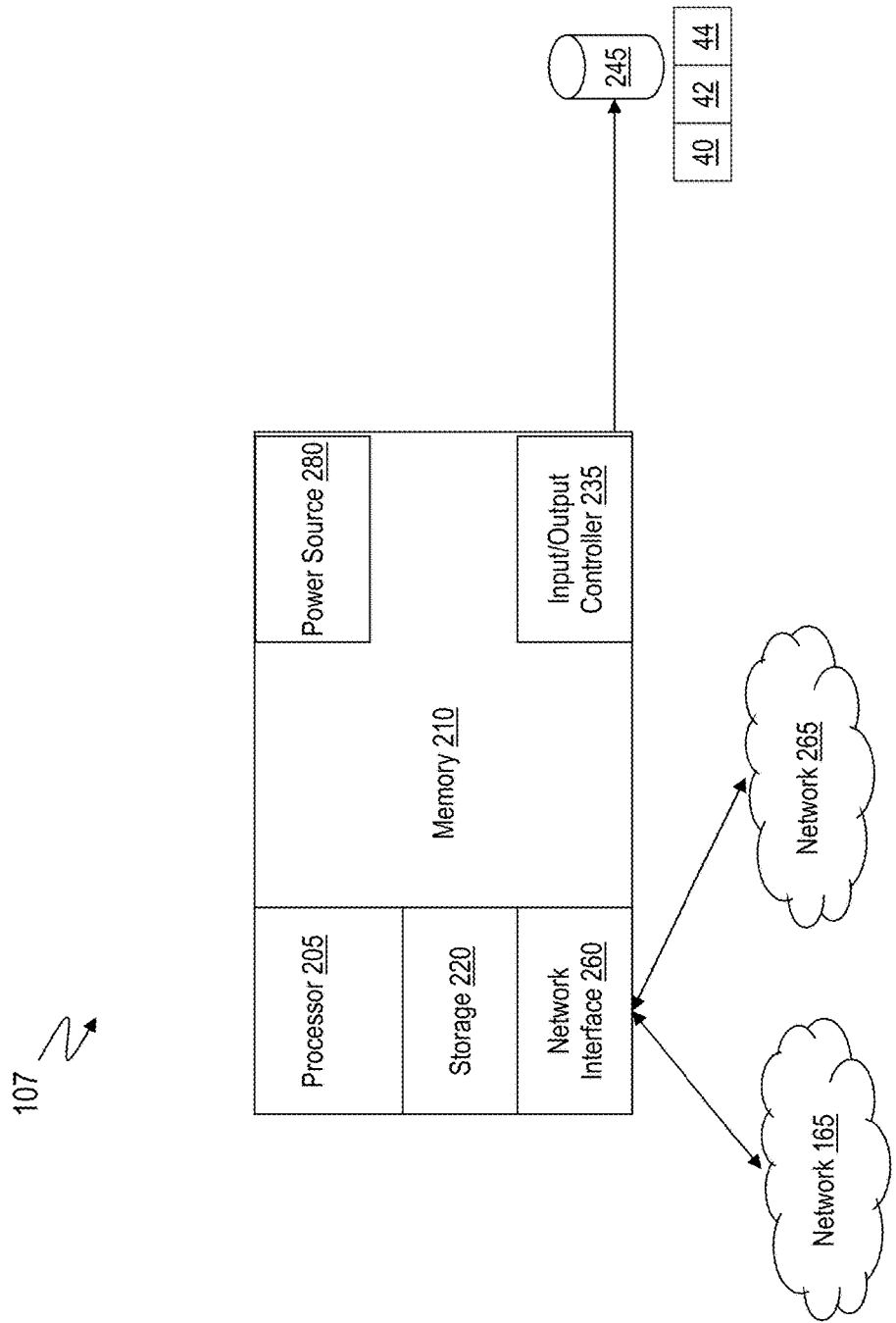
FIG. 2 illustrates example components of a tracking device in accordance with one or more embodiments.

For example, the tracking device 107 may be an electronic device that transmits the tracking status message to a shipment-tracking server 110, which is at a remote location. FIG. 2 illustrates example components of the tracking device 107. The tracking device 107 includes, among other components, a processor 205, memory 210, and one or more peripheral devices 245, such as peripheral or control devices, that are communicatively coupled via a local I/O controller 235. The peripheral devices 245 may include, for example, battery sensors, position sensors (altimeter 40, accelerometer 42, Global Positioning System (GPS) 44), indicator/identification lights and the like. The I/O controller 235 may be, for example, one or more buses or other wired or wireless connections, as are known in the art. The I/O controller 235 may have additional elements, which are omitted for simplicity, such as controllers, buffers (caches), drivers, repeaters, and receivers, to enable communications.

The processor 205 is a hardware device for executing hardware instructions or software, particularly those stored in memory 210. The processor 205 may be a custom made or commercially available processor, a central processing unit (CPU), an auxiliary processor among several processors associated with the system 100, a semiconductor based microprocessor (in the form of a microchip or chip set), a macroprocessor, or other device for executing instructions.

The memory 210 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 210 may incorporate electronic, magnetic, optical, or other types of storage media. Note that the memory 210 may have a distributed architecture, where various components are situated remote from one another but may be accessed by the processor 205.

The instructions in memory 210 may include one or more separate programs, each of which comprises an ordered listing of executable instructions for implementing logical functions. In the example of FIG. 2, the instructions in the memory 210 include a suitable operating system (OS). The operating system essentially may control the execution of other computer programs and provides scheduling, input-output control, file and data management, memory management, and communication control and related services. Additional data, including, for example, instructions for the processor 205 or other retrievable information, may be stored in storage 220, which may be a storage device such as a hard disk drive or solid state drive. The stored instructions in memory 210 or in storage 220 may include those enabling the processor 205 to execute one or more aspects of the systems, methods and computer program products of this disclosure.

The tracking device 107 further includes a power source 280, such as a battery, that supplies power for the components of the tracking device 107 to operate. The power source 280 may be any type of battery, such as a primary cell or a secondary cell. The power source 280 may have limited amount of power that the components of the tracking device 107 can draw from, at least until the power source 280 is recharged.

The tracking device 107 further includes a network interface 260 for coupling to a network 165. The network interface 260 may include a network interface card (NIC) or modulator/demodulator (for accessing other files, devices, systems, or a network), a radio frequency (RF) or other transceiver, a telephonic interface, a bridge, a router, and the like. In an example, the network interface 260 facilitates communication using at least two communication protocols, a short-range communication protocol and a long-range communication protocol such as L. The short-range communication protocol is used for communicating with devices within a predetermined distance from the tracking device 107. For example, the predetermined distance may be four meters, 10 meters, 50 meters, 100 meters, or the like. The short-range communication protocol may be used with communication protocols such as Near Field Communication® (NFC), ZigBee®, Bluetooth®, and the like. Instead, the long-range communication protocol is used for communicating with devices such as the shipment-tracking server, which are farther away from the tracking device 107 for the short-range communication protocol to be used. For example, the long-range communication protocol may be used for communicating with devices, which are more than a mile away from the tracking device 107. The long-range communication may include satellite-based communication. A few more examples of short-range communication protocols are WiFi, Bluetooth, Z-wave, Insteon, and the like. A few examples of long-range communication protocols are 3GPP, LTE, GPRS, Long Range WiFi, Satellite, and the like.

The network 165 may facilitate long-range communication. For example, the network 165 may be an IP-based network for communication between the tracking device 107 and an external server (such as the shipment-tracking server 110), client and the like via a broadband connection. In one or more embodiments, the network 165 may be a satellite network for communicating with the shipment-tracking server 110. The network 165 may also be a mobile or cellular network for communicating with the shipment-tracking server 110. The network 165 transmits and receives data between the tracking device 107 and the external systems.

The network interface 260 further facilitates short-range communication, such as via a second network 265. The network 265 may be a peer-to-peer network that facilitates the tracking device 107 to communicate with other the other tracking devices 117 and 127, such as those within a predetermined distance. For example, the network interface 260 communicates with the other tracking devices 117 and 127 using a short-range communication protocol K, which is different from the long-range protocol L. For example, K may be a protocol like Zygbee while L may be a protocol like LTE. Further, the network interface 260, when communicating using the short-range protocol K, uses less battery power than when communicating using the long-range protocol L. For example, the network interface 260 may use k watts of power when communicating using the short-range protocol K, and may use l watts of power when communicating using the long-range protocol L. The amount of power k used for the short-range communication is substantially less than l, which is used for the long-range communication.

Figure 3:
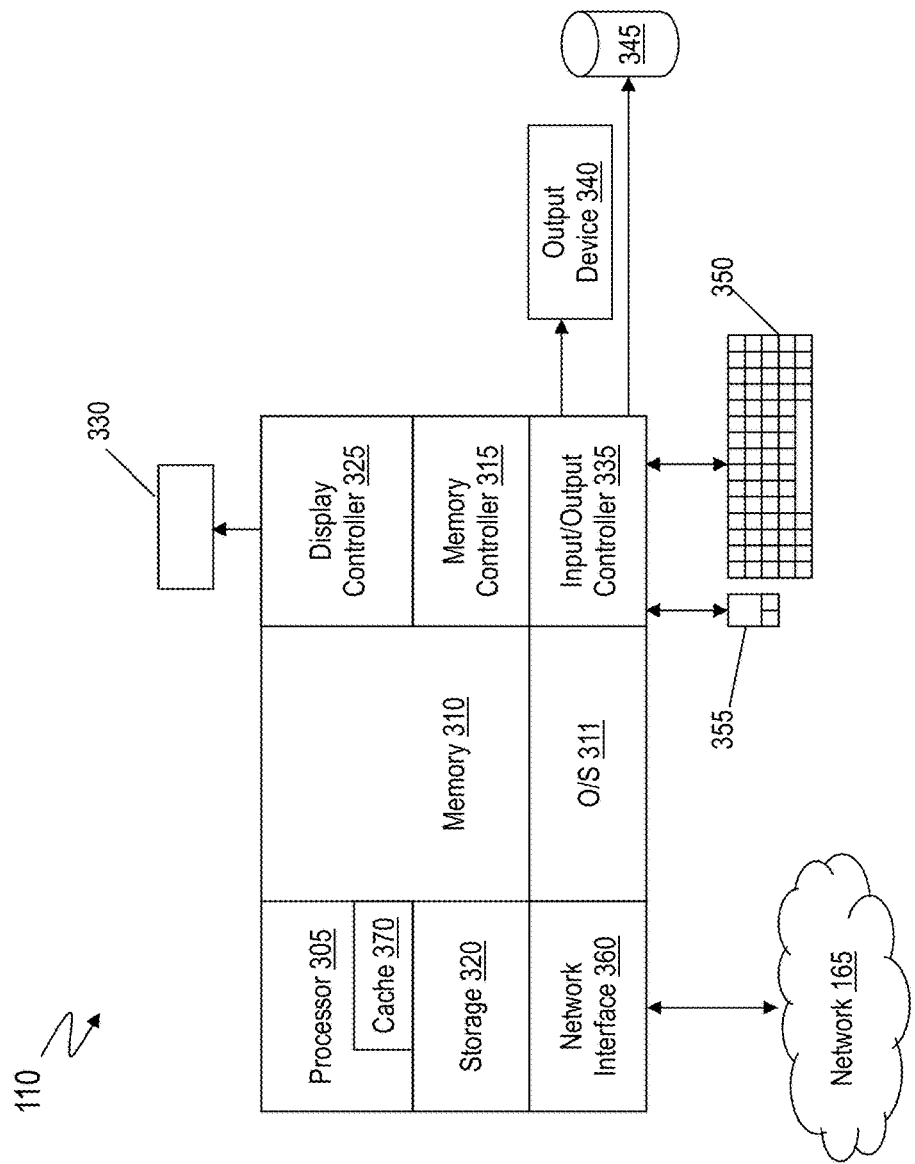
FIG. 3 illustrates components of an example shipment-tracking server in accordance with one or more embodiments.

The shipment-tracking server 110 may be a central server that tracks the one or more shipment items 105, 115, and 125. FIG. 3 illustrates components of an example shipment-tracking server 110. The shipment-tracking server 110 may be a communication apparatus, such as a computer. For example, the shipment-tracking server 110 may be a desktop computer, a tablet computer, a laptop computer, a phone, such as a smartphone, a server computer, or any other device that communicates via the network 165. The shipment-tracking server 110 includes hardware, such as electronic circuitry.

The shipment-tracking server 110 includes, among other components, a processor 305, memory 310 coupled to a memory controller 315, and one or more input devices 345 and/or output devices 340, such as peripheral or control devices, that are communicatively coupled via a local I/O controller 335. These devices 340 and 345 may include, for example, battery sensors, position sensors, indicator/identification lights and the like. Input devices such as a conventional keyboard 350 and mouse 355 may be coupled to the I/O controller 335. The I/O controller 335 may be, for example, one or more buses or other wired or wireless connections, as are known in the art. The I/O controller 335 may have additional elements, which are omitted for simplicity, such as controllers, buffers (caches), drivers, repeaters, and receivers, to enable communications.

The I/O devices 340, 345 may further include devices that communicate both inputs and outputs, for instance disk and tape storage, a network interface card (NIC) or modulator/demodulator (for accessing other files, devices, systems, or a network), a radio frequency (RF) or other transceiver, a telephonic interface, a bridge, a router, and the like.

The processor 305 is a hardware device for executing hardware instructions or software, particularly those stored in memory 310. The processor 205 may be a custom made or commercially available processor, a central processing unit (CPU), an auxiliary processor among several processors associated with the shipment-tracking server 110, a semiconductor based microprocessor (in the form of a microchip or chip set), a macroprocessor, or other device for executing instructions. The processor 305 includes a cache 370, which may include, but is not limited to, an instruction cache to speed up executable instruction fetch, a data cache to speed up data fetch and store, and a translation lookaside buffer (TLB) used to speed up virtual-to-physical address translation for both executable instructions and data. The cache 370 may be organized as a hierarchy of more cache levels (L1, L2, and so on.).

The memory 310 may include one or combinations of volatile memory elements (for example, random access memory, RAM, such as DRAM, SRAM, SDRAM) and nonvolatile memory elements (for example, ROM, erasable programmable read only memory (EPROM), electronically erasable programmable read only memory (EEPROM), programmable read only memory (PROM), tape, compact disc read only memory (CD-ROM), disk, diskette, cartridge, cassette or the like). Moreover, the memory 310 may incorporate electronic, magnetic, optical, or other types of storage media. Note that the memory 310 may have a distributed architecture, where various components are situated remote from one another but may be accessed by the processor 305.

The instructions in memory 310 may include one or more separate programs, each of which comprises an ordered listing of executable instructions for implementing logical functions. In the example of FIG. 3, the instructions in the memory 310 include a suitable operating system (OS) 311. The operating system 311 essentially may control the execution of other computer programs and provides scheduling, input-output control, file and data management, memory management, and communication control and related services.

Additional data, including, for example, instructions for the processor 305 or other retrievable information, may be stored in storage 320, which may be a storage device such as a hard disk drive or solid state drive. The stored instructions in memory 310 or in storage 320 may include those enabling the processor to execute one or more aspects of the systems and methods of this disclosure.

The shipment-tracking server 110 may further include a display controller 325 coupled to a user interface or display 330. In some embodiments, the display 330 may be an LCD screen. In other embodiments, the display 330 may include a plurality of LED status lights. In some embodiments, the shipment-tracking server 110 may further include a network interface 360 for coupling to the network 165. The network 165 may be implemented in a wireless fashion, for example, using wireless protocols and technologies, such as WiFi, WiMax, satellite, or any other. The network 165 may also be a packet-switched network such as a local area network, wide area network, metropolitan area network, the Internet, or other similar type of network environment. The network 165 may be a fixed wireless network, a wireless local area network (LAN), a wireless wide area network (WAN) a personal area network (PAN), a virtual private network (VPN), intranet or other suitable network system and may include equipment for receiving and transmitting messages.

As described earlier, the tracking device 107 may send a tracking status message 120 to the shipment-tracking server 110 using the long-range protocol L, and send a group message 130 to other tracking devices 117 and 127 using the short-range protocol K. The tracking status message 120 from includes among other information, a geographic location of the tracking device 107, and an identity of the corresponding shipment item 115. The group message 130 from the tracking device 127 may include the identity of the corresponding shipment item 125, among other information. For example, the group message 130 may further include an identity of one or more shipment-tracking servers associated with the shipment item 125. For example, a second shipment-tracking server, distinct from the shipment-tracking server 110, tracks the shipment item 125. The second shipment-tracking server may track the shipment item 125 in addition or alternatively to the shipment-tracking server 110 tracking the shipment item 125. The same shipment server may track the location of all shipment items, or different shipment servers may track the location of different shipment items.

Figure 4:
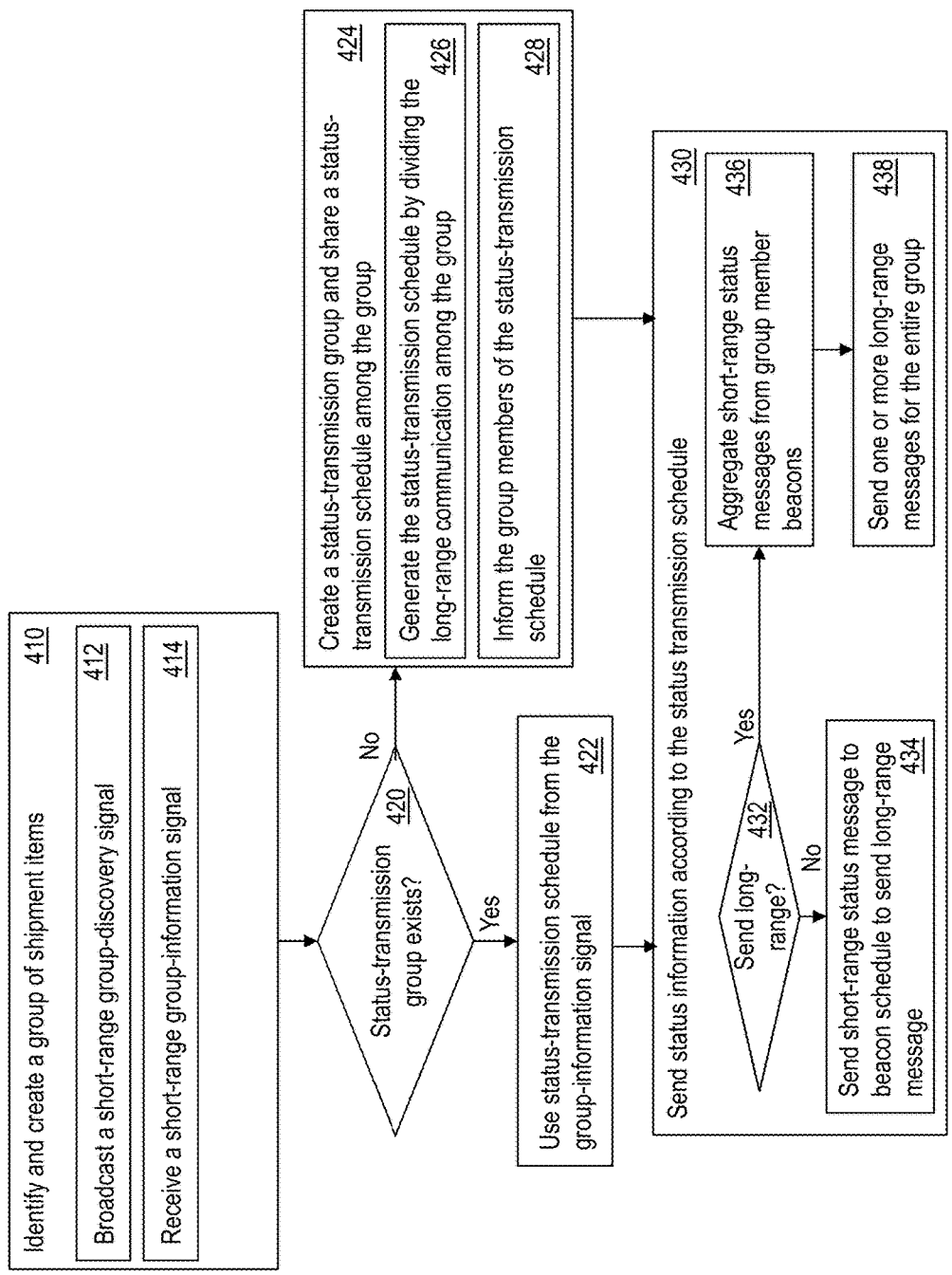
FIG. 4 illustrates a flowchart of an example method for a tracking device to improve battery efficiency by reducing the power consumed by the tracking device for communicating tracking status message to shipment-tracking server in accordance with one or more embodiments.

FIG. 4 illustrates a method for the tracking device 107 to improve battery efficiency by reducing the power consumed by the tracking device 107 for communicating the tracking status message 120 to the shipment-tracking server 110. The method may be implemented by one of the tracking devices 107, 117, or 127. For this example, let us consider that the tracking device 107, which is associated with the shipment item 105, implements the method, but it is understood that any of the tracking devices may implement the method illustrated.

The operation of the tracking devices 107, 117, 127 will now be described with reference to FIGS. 4, 5 and 6. Beginning with the methodology shown in FIG. 4, the tracking device 107 identifies and creates a group of shipment items, as shown at block 410. For example, the tracking device 107, using the network interface 260, broadcasts a short-range group-discovery message, as shown at block 412. The short-range group-discovery message, may use the short-range protocol type, which uses 1 watts of power. The short-range group-discovery message reaches neighboring shipment items, where neighboring shipment items are the shipment items within a predetermined proximity of the tracking device 107. The predetermined proximity is determined by the range of the short-range protocol K used by the network interface 260 to send the group-discovery message. For example, consider that the shipment items 115 and 125, with the respective tracking devices 117 and 127 are in the predetermined proximity.

Figure 5:
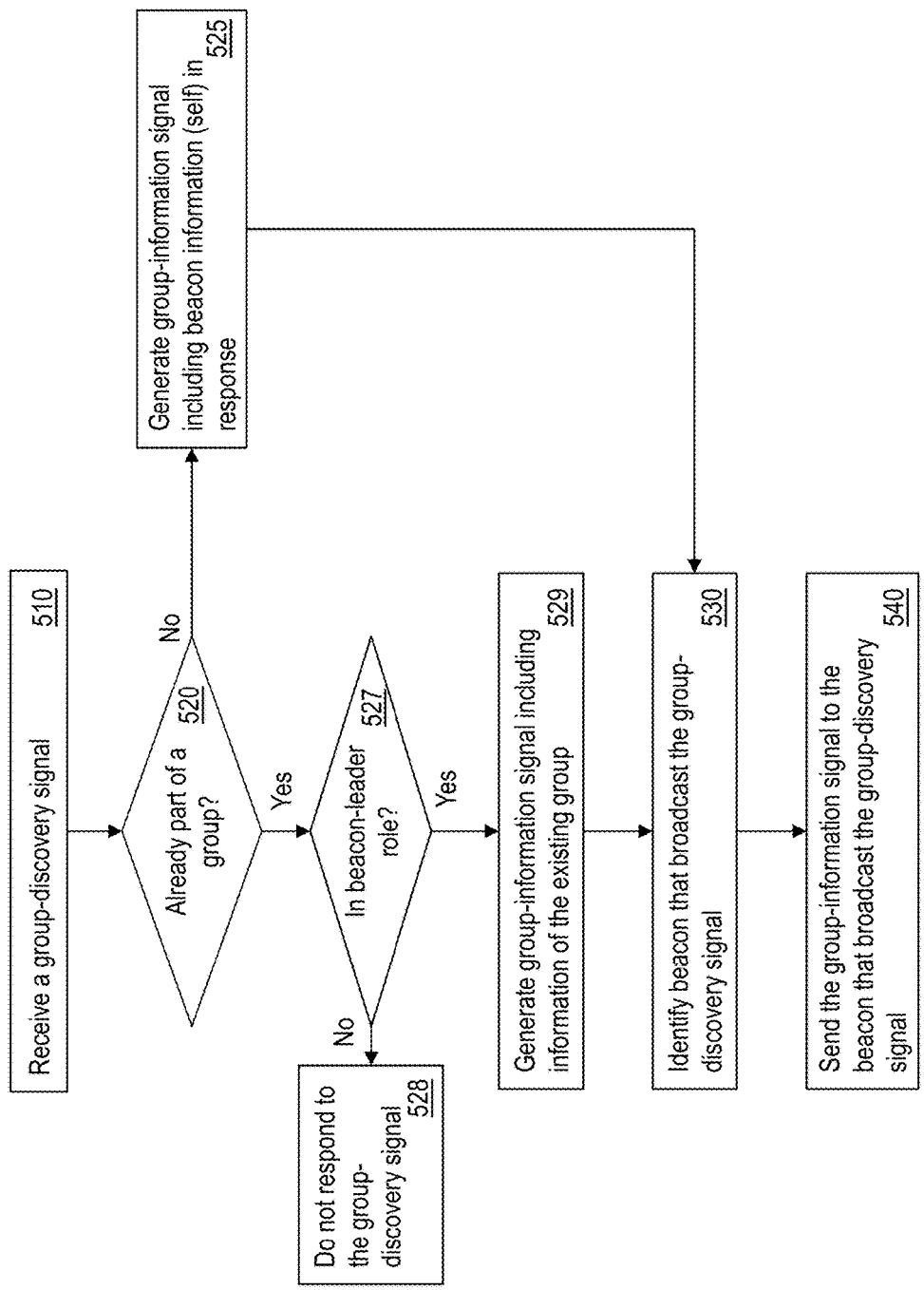
FIG. 5 illustrates a flowchart of an example method for responding to a group-discovery message in accordance with one or more embodiments.
Figure 6:
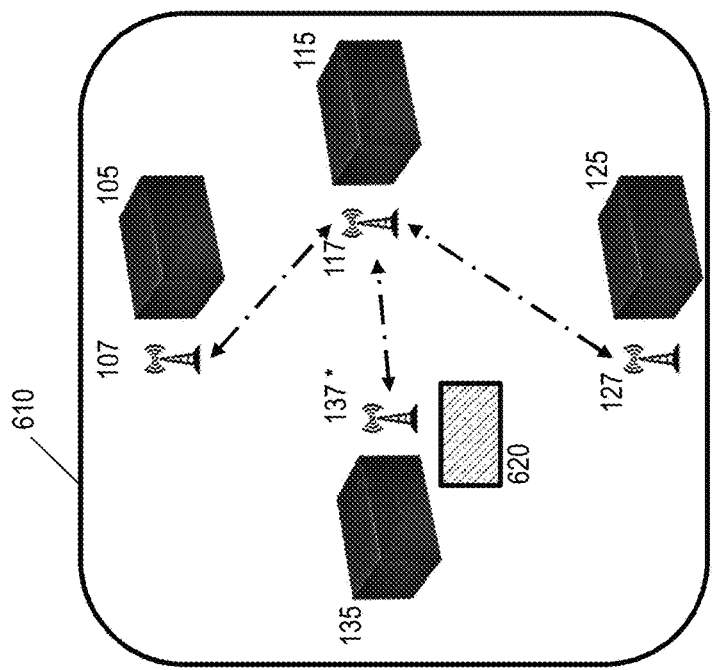
FIG. 6 illustrates an example status-transmission group and a flowchart for an example method for creating the status-transmission group in accordance with one or more embodiments.
Figure 6:
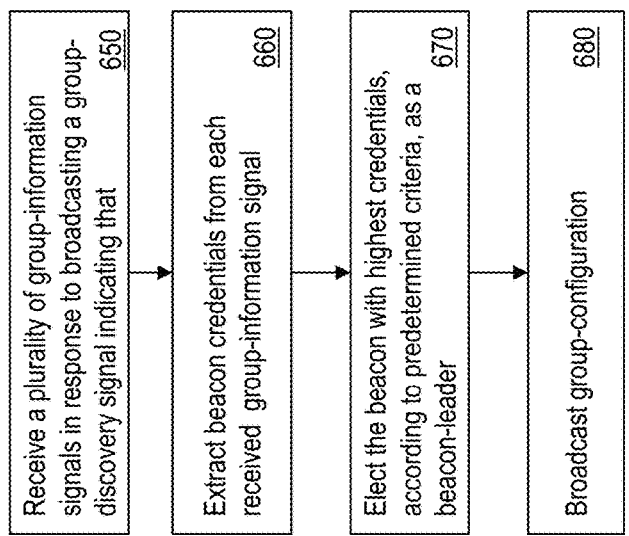

FIG. 5 illustrates a flowchart of an example method that a second tracking device, such as the tracking device 117 (or 127) implements upon receipt of the group-discovery message from a first tracking device, such as the tracking device 107, as shown at block 510. The second tracking device generates and sends, in response, a group-information message, which may include different information based on whether the second tracking device is part of an existing status-transmission group of tracking devices, as shown at block 520. If the second tracking device is already part of an existing status-transmission group, the second tracking device determines if it is in a group-leader role of the status-transmission group, as shown at block 527. If the second tracking device is the group-leader, the second tracking device indicates that the status-transmission group exists, and includes information about the status-transmission group in the group-information message, as shown at block 529. If the second tracking device is not the group-leader, the second tracking device does not respond to the group-discovery message, as shown at block 528. Alternatively, if the second tracking device is not part of a status-transmission group, the group-information message indicates that a status-transmission group does not exist, and instead includes information about the second tracking device itself, as shown at block 525. For example, the information about the second tracking device includes credentials of the second tracking device. The credentials of a tracking device may include a serial number, a model number, a software version, a destination of the corresponding shipment item, the identity of the person who sent the shipment, whether the shipment item is of a specific type like perishable, precious or controlled substance, or any other type of information about the tracking device. Alternatively, if the status-transmission group exists, the group-information message includes the credentials of the group-leader of the existing status-transmission group. The group-information message may further include a status-transmission schedule of the status-transmission group.

The second tracking device identifies the first tracking device that broadcast the group-discovery message, as shown at block 530. The second tracking device proceeds to send the group-information message to the first tracking device, as shown at block 540.

Referring back to FIG. 4, the first tracking device, the tracking device 107 in the example scenario, receives the group-information message from the second tracking device, the tracking device 117 in the example scenario, as shown at block 414. The tracking device 107 may also receive group-information messages from other tracking devices that are in the communication range of the short-range protocol used for broadcasting the group-discovery message. Depending on whether a status-transmission group already exists, the tracking device 107 may broadcast a group-confirmation message using the short-range protocol, K to request membership for the tracking device 107 in the status-transmission group and use a status-transmission schedule of the existing group, which may be received in the group-information message, as shown at blocks 420 and 422.

In case the group-information message indicates that a status-transmission group does not already exist, a status-transmission group is created, as shown at blocks 420 and 424. FIG. 6 illustrates an example status-transmission group 610 and a flowchart for an example method for creating the status-transmission group. In an example, the tracking device 107 creates the status-transmission group 610 if the tracking device 107 is elected as a group-leader. Alternatively, a tracking device other than the tracking device 107, such as a tracking device 137 that is associated with a shipment item 135, is elected the group-leader (denoted by a * in FIG. 6). The group-leader 137 creates the status-transmission group 610. In yet another example, the tracking device 107 creates the status-transmission group 610 and subsequently, the members of the group elect the group-leader 137 from among themselves.

For example, consider the scenario where the tracking device 107 broadcasts the group-discovery message using the short-range protocol, and in response receives a plurality of group-information messages from the other tracking devices in proximity, and in range of the broadcast, as shown at block 650. The plurality of group-information messages indicate that a status-transmission group does not exist because, if the group existed, a single group-information message from the group-leader would have been received. Each of the group-information messages contains identity and other credentials of the respective transmitting tracking device. The tracking device 107, upon receiving, the plurality of the group-information messages, extracts tracking device credentials from each received group-information message, as shown at block 660. The credentials determine which tracking device from the plurality of tracking devices is to be selected as the group-leader 137. For example, the tracking device 107 elects the tracking device 137 with highest credentials, according to predetermined criteria, as the group-leader 137, as shown at block 670. For example, based on the predetermined criteria, the tracking device 107 elects the tracking device with the lowest (or highest) serial number as the group-leader 137. Alternatively, the group-leader 137 is selected based on the lowest (or highest) tracking number of the shipment item associated with the tracking devices. Alternatively, the tracking devices may be categorized, and each tracking device's credentials may include the category of the tracking device. In some embodiments, the category may be determined by the model number of the tracking device, e.g. all devices with the same model belong to one category. In another embodiment, the category may be determined by the battery power remaining in the tracking device, e.g. all devices with more than 70% of remaining battery power are in category 1, while devices with 40%-70% of remaining battery power are in category 2, those with 20%-40% are in category 3 and those with less than 20% power in category 4. In another embodiment, the category may indicate whether the tracking device has an external source of power, e.g. it is attached to a powered or refrigerated container, or whether it runs on battery power alone. The tracking device with the highest category may be elected as the group-leader 137. It is understood that election of the group-leader may be based on any other attribute extracted from the group-information messages instead of those illustrated above.

The tracking device 107, upon electing the group-leader 137, broadcasts a group-configuration message, as shown at block 680. The group-configuration message indicates the identity of the group-leader 137, which has been elected as the group-leader of the status-transmission group 610. The group-configuration message is broadcast using the short-range protocol for receipt by each member of the status-transmission group 610. Accordingly, each member of the status-transmission group 610 is notified of their membership in the status-transmission group 610 and the group-leader 137.

Returning to FIG. 4, the group-leader 137 generates and shares a status-transmission schedule 620 with the members of the status-transmission group 610, as shown at block 424. For example, the group-leader 137 generates the status-transmission schedule 620 by dividing/distributing the long-range communications among each member of the status-transmission group 610, as shown at block 426. The group-leader 137 further transmits the status-transmission schedule 620 to the group members, as shown at block 428.

The status-transmission schedule 620 specifies which tracking device from the status-transmission group 610 sends the tracking information of the members of the entire status-transmission group 610 to the corresponding shipment tracking servers. The status-transmission schedule 620 indicates the time-points at which the member tracking devices take turns of sending the tracking information using the long-range communication. For example, the schedule may be based in the order of the sequence numbers of the member tracking devices, or in a randomized order. Further, the status-transmission schedule 620 specifies a primary and a secondary tracking device for each long-range transmission. If the primary tracking device has left the group or is unable to send the tracking information for all the group members, the secondary tracking device may take over.

Each tracking device, including the tracking device 107, sends status information for the entire group according to the status-transmission schedule 620, as shown at block 430. For example, the tracking device 107 checks the status-transmission schedule 620 to determine if it is time for the tracking device 107 to send the long-range communication, as shown at block 432. For example, the status-transmission schedule 620 includes a time-table that specifies a time-point for each of the tracking devices in the status-transmission group 610 to transmit the long-range communication. If it is the tracking device's 107 turn to send the long-range communication, the tracking device 107 aggregates the tracking information for each of the members of the status-transmission group 610, as shown at block 436. For example, the tracking device 107 may request the member tracking devices for the tracking information of the corresponding shipment items using short-range status messages. The tracking information may include a serial numbers or other type of identification of the shipment items. The tracking information may further include identity of the shipment-tracking server 110 that is tracking the status of specific shipment item. For example, a first shipment-tracking server may track the shipment item 105, and a second shipment-tracking server, distinct from the first, may track the shipment item 115.

The tracking device 107 sends the tracking information for each of the members in the status-transmission group 610 to the corresponding shipment-tracking servers, as shown at block 438. The tracking device 107 sends the tracking information using the long-range communication.

Alternatively, if it is not the tracking device's 107 turn to send the tracking information using the long-range communication, the tracking device 107 sends a short-range communication to the tracking device that is scheduled to transmit the tracking information, as shown at block 434. For example, the tracking device 107 transmits the tracking information of the corresponding shipment item 105 to the tracking device scheduled to transmit the tracking information to the shipment-tracking server 110. The tracking device scheduled to transmit the tracking information relays the tracking information using the long-range communication.

Such a scheme facilitates the saving of power by all the tracking devices in the status-transmission group 610. As an example, consider that 200 shipment items are placed for transportation together, such as on a train, a ship, or any other mode of transportation. Using the short-range communication, which uses the k watts of power, the tracking devices associated with the respective shipment items form the status-transmission group 610. Each long term communication uses l watts of power. In this scenario, by reducing each tracking device to only send information 1/200 times as frequently, the power usage of each tracking device will be 1/200 for communication, or (k+l/200). Because k is a very small fraction of l, the power savings is roughly divided by the number of the shipment items in the status-transmission group, which can extend the life of the battery by that factor, in this case by a factor of 200.

In an example, after transmitting the tracking information to the shipment-tracking server(s), the tracking device 107 may rerun the group-discovery to determine the group configuration at the current time, and ensure that there have not been any changes in the status-transmission group. For example, if the shipment item 115, and thus the corresponding tracking device 117 have been de-boarded, the status-transmission schedule 620 may require adjustments. For example, the shipment item 115 may have reached its destination, and thus disembarked from the transportation, causing the tracking device 117 to be removed from the status-transmission group 610. Accordingly, the remaining tracking devices go through the creation of the group and election of a new group-leader, if required, as described herein.

Accordingly, the technical solutions described herein facilitate improving battery efficiency of a tracking device that is actively tracking a status of a shipment item. Shipping containers (and other types of packages and shipment items) are commonly tracked using GPS based tracking units. These tracking units or tracking devices generally send a message to a central site at periodic intervals to indicate their position. The tracking devices consume power as they send the messages, and replacing batteries in the trackers is a significant operational expense and hassle for operators who track the containers or packages using such active tracking devices.

The technical solutions described herein facilitate reducing the consumption of battery power in multiple packages. To this end, the technical solutions provide techniques for determining containers and packages that are being transported together, e.g., on a ship, a train or a truck. The containers and packages may further be related, such as destined to the same destination, or being tracked by the same shipment-tracking server, or being transported by the same shipping company etc. The containers and packages are grouped together. From among the active devices of the grouped shipment items, only one needs to communicate on behalf of everyone. By having each tracking device determine if they are part of the group using short-range communication, each tracking device can reduce battery consumption by sharing the burden for sending the tracking information of the entire group. As an example if a group has N packages/containers, a tracking device of one of the containers sends the tracking information on behalf of the N members. For example, the tracking device may send N separate tracking messages, which may be N times slower, while maintaining the same granularity for sharing. Each member of the group takes turns to send the tracking information on behalf of the entire group based on a transmission schedule that a group-leader tracking device generates.

Tracking devices using long distance communication consume more power than two tracking devices communicating at short intervals. Because during shipping of containers, or transfer of packages, several packages travel in a group (e.g. several thousand containers or a ship, several hundred containers on a train, or several tens of packages for delivery on a truck), by grouping the transmission of the tracking information as described herein improves the battery consumption efficiency of the tracking devices of the packages. When a group of packages is being transported, the tracking devices can discover or create a group and share the burden of informing the server of locations of all of the packages. Accordingly, the technical solutions increase the life-time for the tracking devices.

The technical solutions described herein further facilitate automatic and dynamic group creation and transmission schedule creation. The technical solutions further provide an automated process by which a tracking device that transmits the tracking information is automatically selected, and the role is shared over time by different tracking devices.

The present technical solutions may be a system, a method, and/or a computer program product at any possible technical detail level of integration. The computer program product may include a computer readable storage medium (or media) having computer readable program instructions thereon for causing a processor to carry out aspects of the present technical solutions.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present technical solutions may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN)

or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present technical solutions.

Aspects of the present technical solutions are described herein with reference to flowchart illustrations and/or block diagrams of methods, apparatus (systems), and computer program products according to embodiments of the technical solutions. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present technical solutions. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

A second action may be said to be "in response to" a first action independent of whether the second action results directly or indirectly from the first action. The second action may occur at a substantially later time than the first action and still be in response to the first action. Similarly, the second action may be said to be in response to the first action even if intervening actions take place between the first action and the second action, and even if one or more of the intervening actions directly cause the second action to be performed. For example, a second action may be in response to a first action if the first action sets a flag and a third action later initiates the second action whenever the flag is set.

To clarify the use of and to hereby provide notice to the public, the phrases "at least one of <A>, <B>, . . . and <N>" or "at least one of <A>, <B>, . . . <N>, or combinations thereof" or "<A>, <B>, . . . and/or <N>" are to be construed in the broadest sense, superseding any other implied definitions hereinbefore or hereinafter unless expressly asserted to the contrary, to mean one or more elements selected from the group comprising A, B, . . . and N. In other words, the phrases mean any combination of one or more of the elements A, B, . . . or N including any one element alone or the one element in combination with one or more of the other elements which may also include, in combination, additional elements not listed.

It will also be appreciated that any module, unit, component, server, computer, terminal or device exemplified herein that executes instructions may include or otherwise have access to computer readable media such as storage media, computer storage media, or data storage devices (removable and/or non-removable) such as, for example, magnetic disks, optical disks, or tape. Computer storage media may include volatile and non-volatile, removable and non-removable media implemented in any method or technology for storage of information, such as computer readable instructions, data structures, program modules, or other data. Such computer storage media may be part of the device or accessible or connectable thereto. Any application or module herein described may be implemented using computer readable/executable instructions that may be stored or otherwise held by such computer readable media.

The descriptions of the various embodiments of the present technical solutions have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application, or technical improvement over technologies found in the marketplace, or to enable others of ordinary skill in the art to understand the embodiments disclosed herein.

What is claimed is:

1. A method for tracking a plurality of shipment items, the method comprising:
    transmitting, by a first tracking device that is associated with a first shipment item, a request for a tracking information of a second shipment item that is associated with a second tracking device, the request is transmitted using a first protocol;
    receiving, by the first tracking device that is associated with the first shipment item, the tracking information of the second shipment item, the tracking information being transmitted by the second tracking device using a second protocol;

broadcasting, by the first tracking device, a group-discovery message using the first protocol;

receiving, in response, by the first tracking device, a group-information message from a plurality of tracking devices using the first protocol, wherein the second tracking device is from the plurality of tracking devices; and broadcasting, by the first tracking device, using the first protocol, a group-confirmation message for receipt by the plurality of tracking devices, indicating that the first tracking device and the plurality of tracking devices are part of a status-transmission group.

2. The method of claim 1, wherein the group-discovery message includes an identification of a shipment-tracking server that is tracking the first shipment item that is associated with the first tracking device, and wherein the plurality of tracking devices are respectively associated with shipment items that are being tracked by the same shipment-tracking server as the first shipment item.

3. The method of claim 1, wherein the group-discovery message includes an identification of a destination of the first shipment item that is associated with the first tracking device, and wherein the plurality of tracking devices are respectively associated with shipment items for the same destination as the first shipment item.

4. The method of claim 1, further comprising, generating, by the first tracking device, a status-transmission schedule for the plurality of tracking devices, wherein the status-transmission schedule specifies a time-point for each respective tracking device from the status-transmission group to transmit tracking information for entire status-transmission group.

5. The method of claim 1, wherein communication using the first protocol consumes lesser power than communication using the second protocol.

6. The method of claim 1, wherein the first protocol is for short-range communication and the second protocol is for long-range communication.

7. The method of claim 1, further comprising:
transmitting, by the first tracking device, a tracking message that includes the tracking information of the second shipment item and a tracking information of the first shipment item.

8. The method of claim 7, wherein transmitting the tracking message further comprises:
sending a first transmitting message for receipt by a first shipment-tracking server, wherein the first transmitting message includes the tracking information of the first shipment item, wherein the first tracking message is transmitted; and
sending a second transmitting message for receipt by a second shipment server, distinct from the first shipment server, wherein the second transmitting message includes the tracking information of the second shipment item, and wherein the second tracking message is transmitted using.

9. The method of claim 8, wherein the second shipment server is identified from the tracking information of the second shipment item associated with the second tracking device.

10. A tracking device for tracking a plurality of shipment items, the tracking device being a first tracking device associated with a first shipment item, and the first tracking device comprising:
a memory;
a network interface; and
a processor in communication with the memory and the network interface, the processor configured to:
receive a tracking information of a second shipment item, the tracking information being transmitted by a second tracking device, wherein the processor receives the tracking information in response to a transmission of a request for the tracking information from the second tracking device, wherein the request is transmitted using a first protocol, which is distinct from a second protocol used for receiving the tracking information;
broadcast a group-discovery message using the first protocol;
receive, in response, a group-information message from a plurality of tracking devices, wherein the second tracking device is from the plurality of tracking devices; and
broadcast a group-confirmation message for receipt by the plurality of tracking devices, indicating that the first tracking device and the plurality of tracking devices are part of a status-transmission group.

11. The tracking device of claim 10, wherein the group-discovery message includes an identification of a shipment-tracking server that is tracking the first shipment item that is associated with the first tracking device, and wherein the plurality of tracking devices are respectively associated with shipment items that are being tracked by the same shipment-tracking server as the first shipment item.

12. The tracking device of claim 10, wherein the processor is further configured to generate a status-transmission schedule for the plurality of tracking devices, wherein the status-transmission schedule specifies a time-point for each respective tracking device from the status-transmission group to transmit tracking information for entire status-transmission group.

13. The tracking device of claim 10, wherein communication using the first protocol consumes lesser power than communication using the second protocol.

14. The tracking device of claim 10, wherein the processor is further configured to transmit a tracking message that includes the tracking information of the second shipment item and a tracking information of the first shipment item.

15. A computer program product for tracking devices when tracking a plurality of shipment items, the computer program product comprising a non-transitory computer readable storage medium, the computer readable storage medium comprising computer executable instructions, wherein the computer readable storage medium comprises instructions to:
broadcast, by a first tracking device that is associated with a first shipment item, a request for a tracking information of a second shipment item that is associated with a second tracking device, wherein the request is broadcast using a first protocol;
in response, receive the tracking information of the second shipment item, the tracking information being transmitted by the second tracking device using a second protocol distinct from the first protocol; and
broadcast a group-discovery message using the first protocol;
receive, in response, a group-information message from a plurality of tracking devices, wherein the second tracking device is from the plurality of tracking devices; and
broadcast a group-confirmation message for receipt by the plurality of tracking devices, indicating that the first tracking device and the plurality of tracking devices are part of a status-transmission group.

16. The computer program product of claim 15, wherein the first protocol is for short-range communication and the second protocol is for long-range communication.

17. The computer program product of claim 15, wherein the group-discovery message includes an identification of a shipment-tracking server that is tracking the first shipment item that is associated with the first tracking device, and wherein the plurality of tracking devices are respectively associated with shipment items that are being tracked by the same shipment-tracking server as the first shipment item.

18. The computer program product of claim 15, wherein communication using the first protocol consumes lesser power than communication using the second protocol.

19. The computer program product of claim 15, wherein the computer readable storage medium comprises further instructions to:

transmit a tracking message that includes the tracking information of the second shipment item and a tracking information of the first shipment item, wherein the tracking message is transmitted using a second protocol.

* * * * *